May 12, 1931.  T. S. MILLER  1,804,945
DEVICE FOR HOISTING A FLOATING OBJECT SUBJECT TO WAVE ACTION
Filed June 19, 1928  6 Sheets-Sheet 1
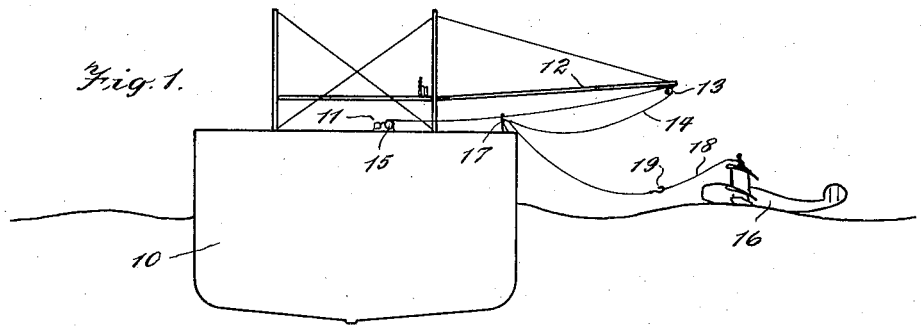
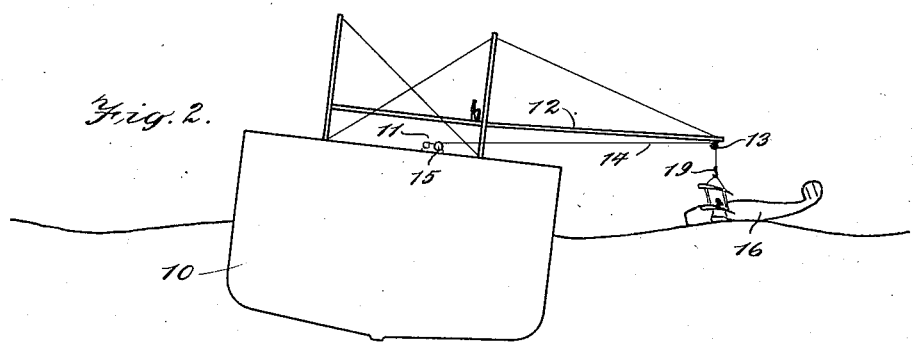
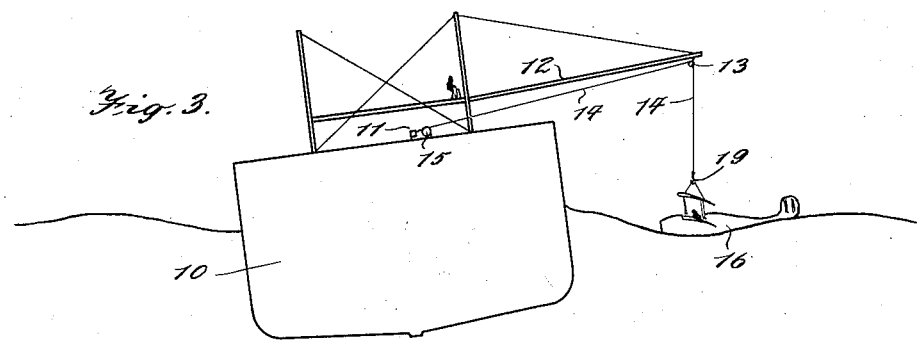
INVENTOR
Thomas Spencer Miller
BY
Gifford & Scull
his ATTORNEYS May 12, 1931.  T. S. MILLER  1,804,945
DEVICE FOR HOISTING A FLOATING OBJECT SUBJECT TO WAVE ACTION
Filed June 19, 1928   6 Sheets-Sheet 2

INVENTOR
Thomas Spencer Miller
BY
Clifford Scull
ATTORNEYS

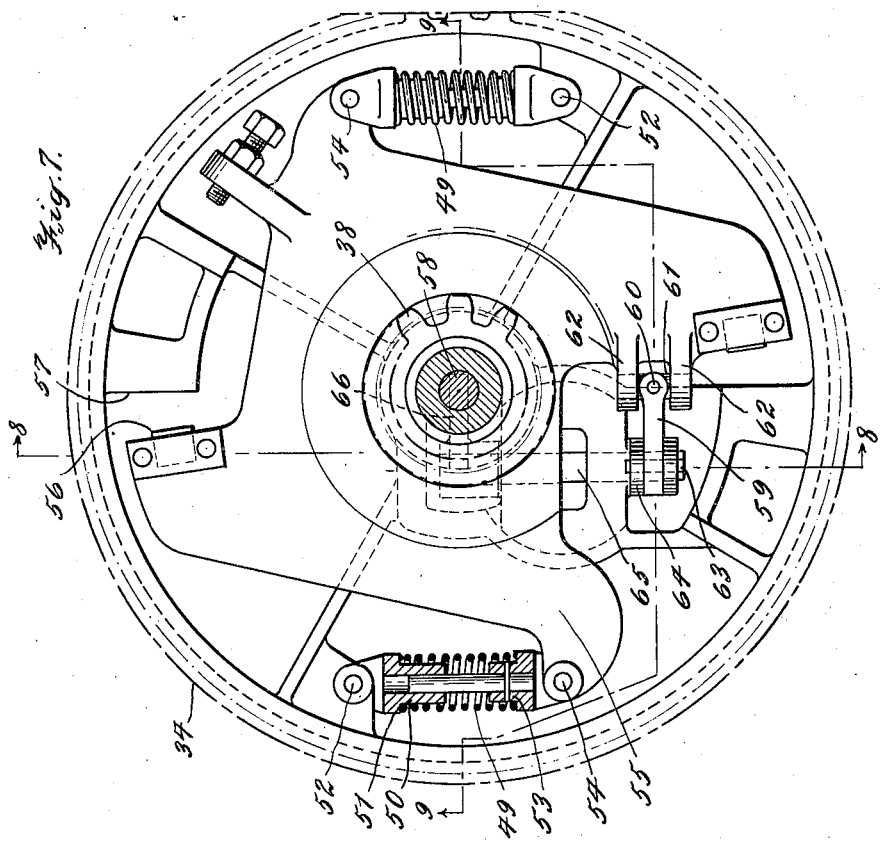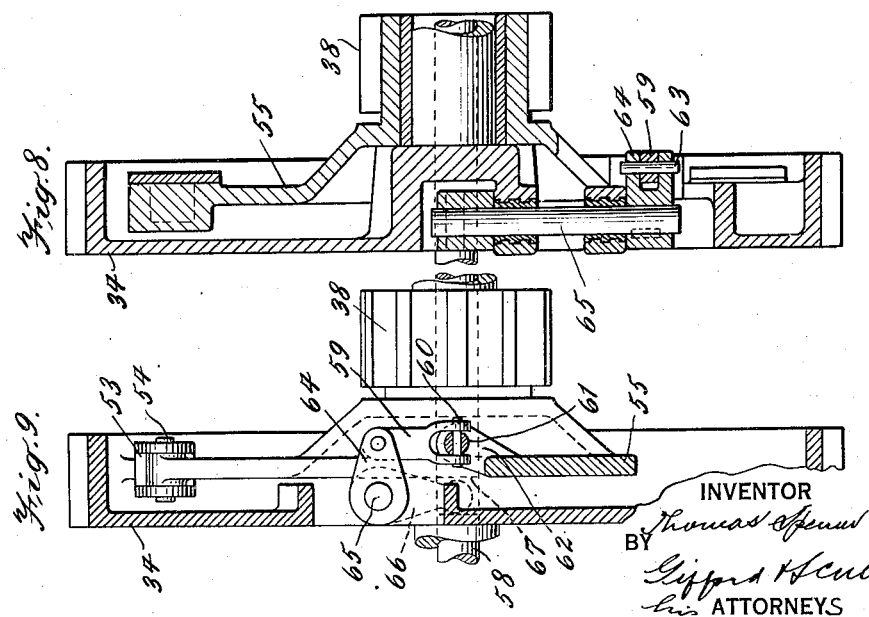

May 12, 1931.  T. S. MILLER  1,804,945
DEVICE FOR HOISTING A FLOATING OBJECT SUBJECT TO WAVE ACTION
Filed June 19, 1928  6 Sheets-Sheet 5
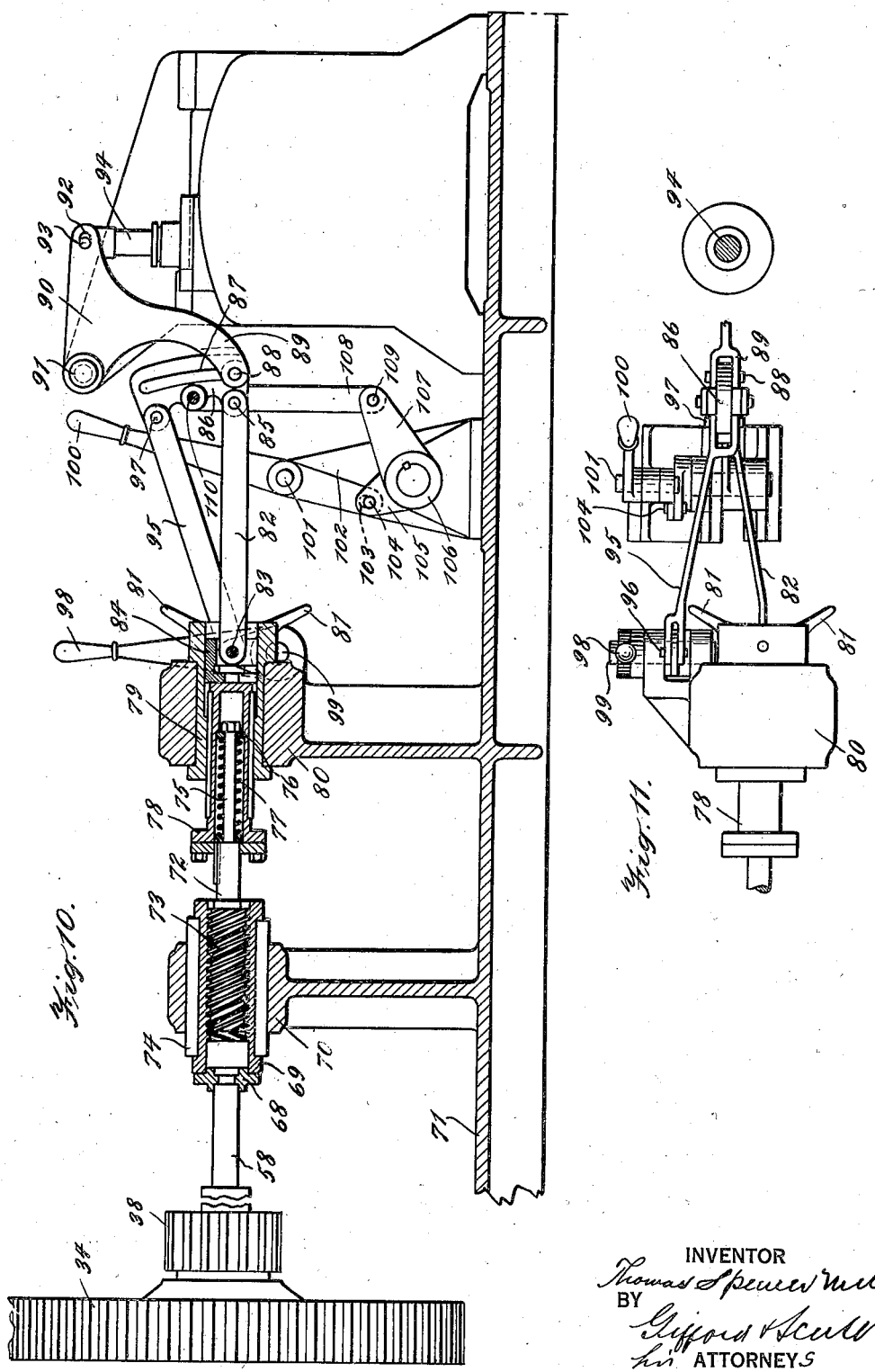
INVENTOR
Thomas Spencer Miller
BY
Gifford & Scull
his ATTORNEYS

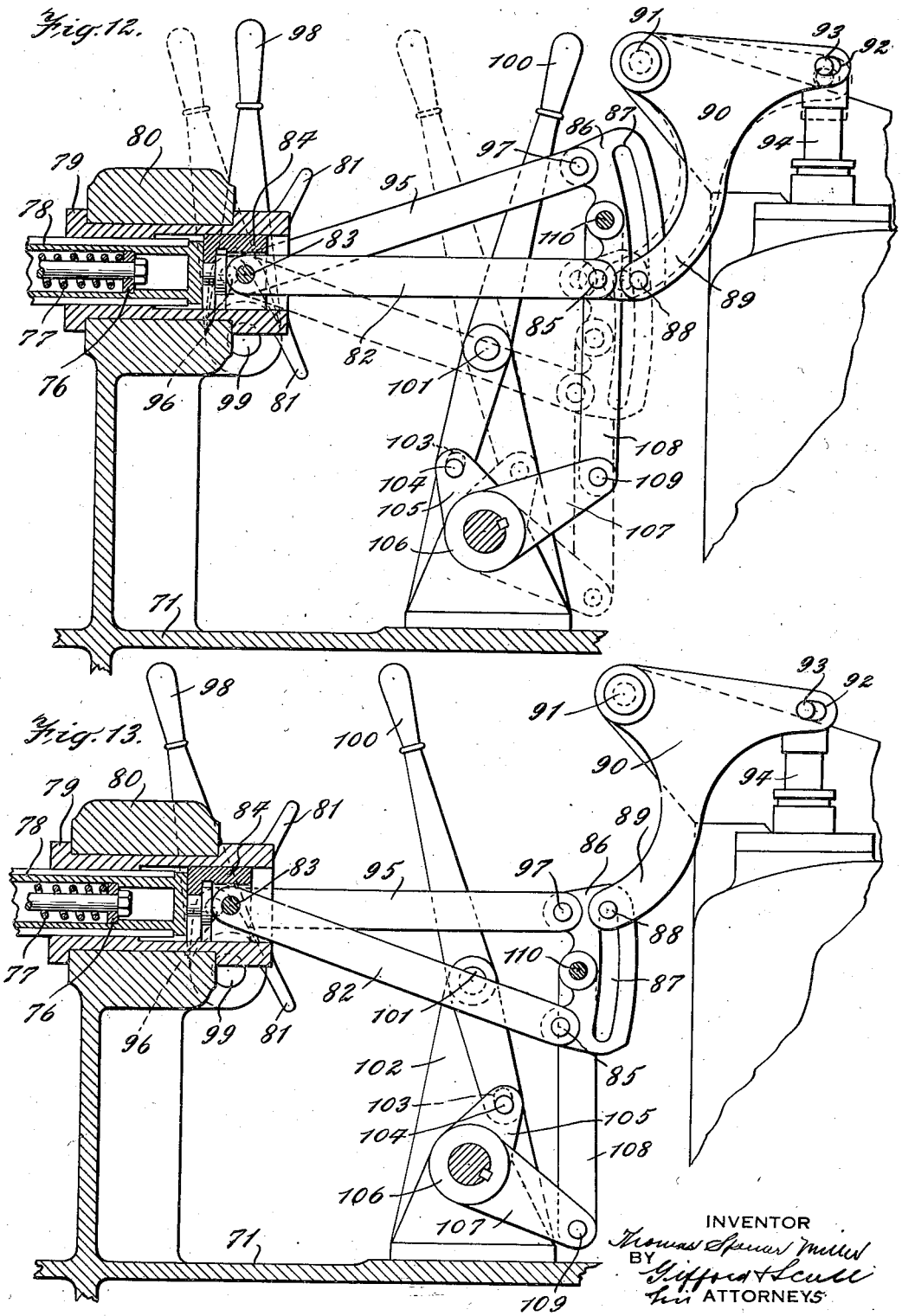

Patented May 12, 1931

1,804,945

UNITED STATES PATENT OFFICE

THOMAS SPENCER MILLER, OF SOUTH ORANGE, NEW JERSEY

DEVICE FOR HOISTING A FLOATING OBJECT SUBJECT TO WAVE ACTION

Application filed June 19, 1928. Serial No. 286,512.

While my invention is not limited thereto, it is particularly applicable for safely hoisting airplanes or seaplanes from the sea to a vessel.

One example of the utility of my device occurs where an airplane from shore may be taken aboard a ship when the sea is more or less rough and the ship is rolling. The airplane drops into and floats upon the sea, preferably on the lee side of the ship, and makes its way by "taxying" to the side of the ship, and from this position is safely lifted by the apparatus embodying my invention onto the ship.

Figure 4:
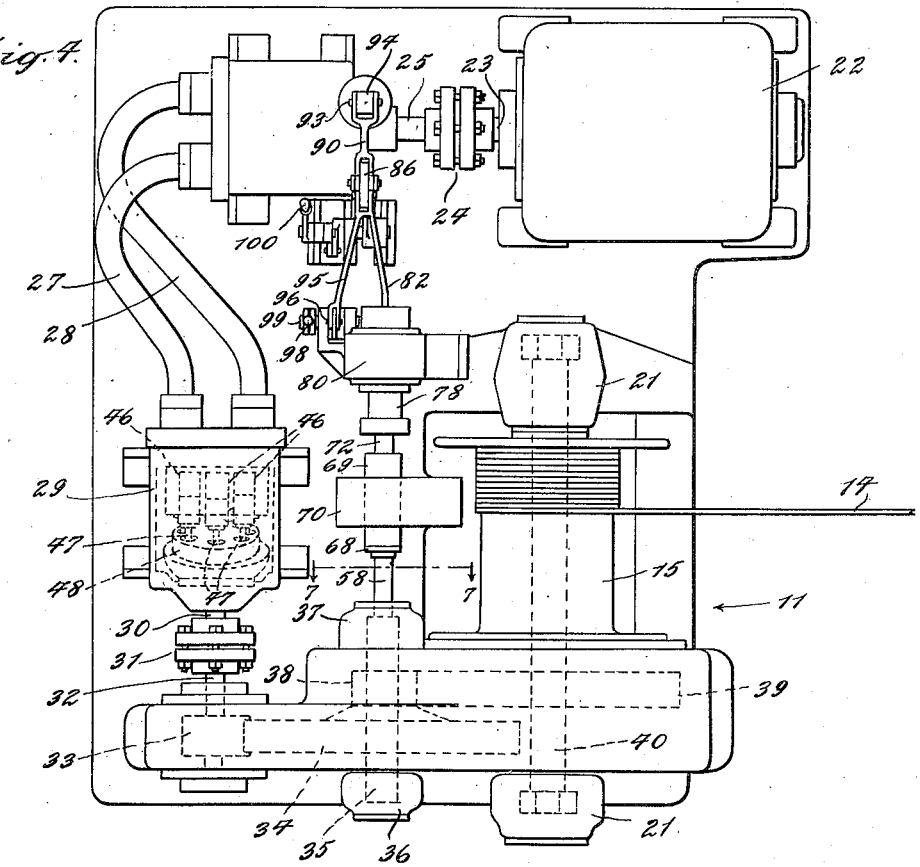
Figure 5:
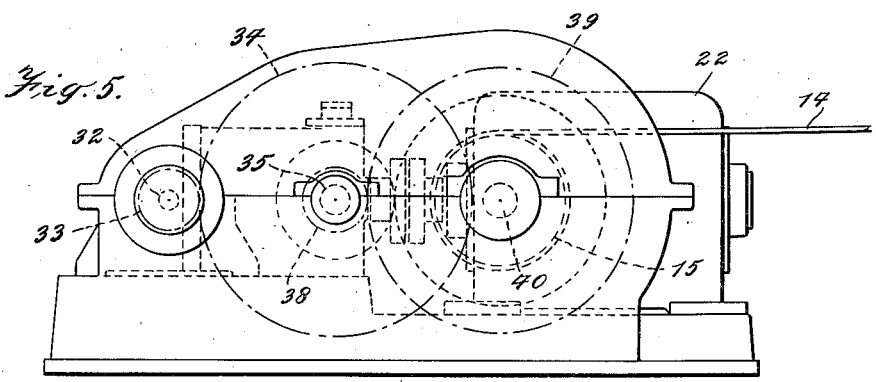
Figure 6:
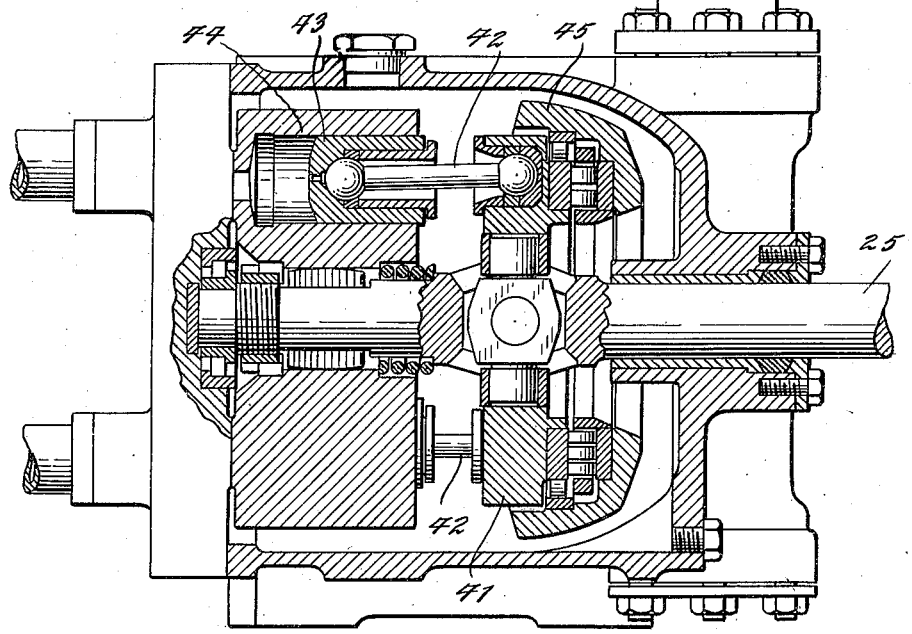
Figure 14:
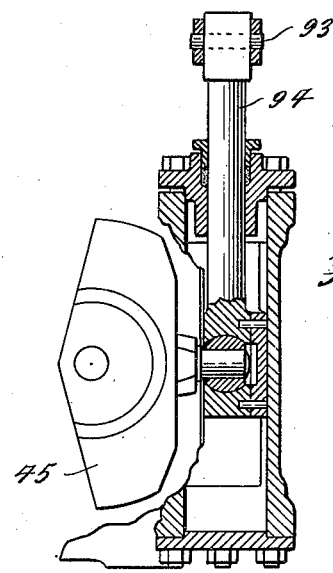

My invention will best be understood by reference to the accompanying drawings, in which I have illustrated a preferred device for carrying out my invention and in which Fig. 1 represents diagrammatically a ship at sea and an airplane alongside of the ship preparing to be hoisted aboard; Fig. 2 is a view similar to Fig. 1, but illustrating the ship rolled to one side, due to the wave action of the sea, the hoisting rope being taut; Fig. 3 is a view similar to Fig. 1, but showing the vessel rolled to the opposite position, the hoist rope paid out, and the seaplane remaining in the sea. Fig. 2 may also represent the airplane just as the boom is at its lowest position moving at zero speed and ready to be hoisted. Figs. 2 and 3 taken together represent an airplane moored to a vessel in a seaway, the mooring rope alternately winding in and paying out as required. Fig. 4 is a plan view of a winch embodying my invention, which is mounted on a ship or other support; Fig. 5 is an end elevation of Fig. 4; Fig. 6 is a cross section of a reversible and variable speed pump; Fig. 7 is a sectional elevation of Fig. 4 taken on the line 7—7 looking in the direction of the arrows, and showing certain parts in section; Fig. 8 is a sectional view taken on the line 8—8 of Fig. 7; Fig. 9 is a sectional view of the parts shown in Fig. 8, but taken at right angles thereto; Fig. 10 is a side elevation partially in section of the mechanism which controls the speed and direction of rotation of the pump in response to the operation of the dynamometer or tension governor; Fig. 11 is a plan view of a portion of Fig. 10; Fig. 12 is a side view, partially in section, of the control mechanism illustrated in Fig. 10 and showing a different position of the parts; Fig. 13 is a view similar to Fig. 12 illustrating the parts shown in Fig. 12 in still another position, and Fig. 14 is a detailed view illustrating the manner in which the position of the tilting box and socket ring are adjusted through the operation of the automatic control mechanism.

Like reference characters indicate like parts throughout the drawings.

Referring, first, to Figs. 1, 2, and 3, 10 is a support which, in the embodiment illustrated, is a ship at sea on which is mounted a winch indicated generally at 11. The ship is equipped with an overhanging boom 12 extending over the water and provided at its end with a pulley 13 over which leads a rope 14 which is wound upon the drum 15 of the winch, and is attached at its free end to an airplane or seaplane or other floating object 16, located substantially beneath the outer end of the boom 12.

The problem is to lift the airplane or other floating object 16 from the sea onto the vessel, although it may sometimes be desirable to moor the floating object to the ship. Hitherto, ships, boats, and seaplanes, have been hoisted from the sea with winches and ropes and booms substantially as shown, but without adequate provision for eliminating the jerks incident to hoisting. For example, when the float had been hooked to the hoisting rope, the boom might swing further down, thus producing slack in the form of a loop in the rope. Immediately following this, the ship rolling in the opposite direction, the rope suddenly became taut, violently jerking the boat or seaplane, thus creating damage and breakage either to the hoist rope or to the fittings on board the floating object, sometimes tearing them loose from the boat.

In accordance with my invention, elastic means are provided between the winch and the floating object which, up to a certain fraction of the weight of the boat, winds in rope when subject to undertension, and pays out rope when subject to an overtension, and means, preferably manually controlled, are provided for hoisting the floating object from the water preferably at a period of the roll when there is the least tendency to produce an overtension in the rope and thereby an injury to the floating object or other parts. In hoisting a seaplane or other float from the sea, it will be necessary to accelerate the movement of this float. Too rapid acceleration produces great stresses. However, if the hoisting rope be taut at a period of roll, as indicated in Fig. 2, then if the winch be manually operated to full capacity, the seaplane will be lifted and accelerated with the boom on its rise to a point indicated in Fig. 3, and at the same time hoisted towards the rising boom. In other words, the overhanging boom 12 in its lowermost position moves at zero speed, and when it starts to rise, the speed is gradually increased to maximum and then decelerated to zero speed. I propose to provide, therefore, that an airplane may be lifted coincident with the beginning of the rise of the boom, and thus accelerated at the same velocity of the end as the boom, but during the operation of lifting the float or seaplane by the roll of the ship, the winch itself is hoisting at a slow velocity, so that before the boom again swings down to its lowermost position, the seaplane will be well above the sea and thereby prevent any possibility of its striking the sea.

The first operation, after an airplane or other float is beneath the end of the boom, is to attach the free end of the rope to the airplane, and this is accomplished by a seaman 17 throwing to the pilot a lanyard 18, previously attached to hook 19. The pilot hauls the rope towards himself and secures the hook 19 to the airplane.

I will now describe the winch 11 and associated parts which are mounted on the ship 10 or other support.

The rope 14 is wound upon the drum 15 mounted in bearings 21 of the winch, which is indicated generally as 11. The drum 15 is primarily driven by a substantially constant speed motor 22 which is here shown as of the electric type, and the shaft 23 of which always rotates in one direction and is preferably connected through a flexible coupling 24 to the drive shaft 25 of a variable speed reversible pump, the details of which will be hereinafter more fully described, and which is connected by pipes 27 and 28 to a hydraulic motor 29, the shaft 30 of which is shown connected through a flexible coupling 31 to a drive shaft 32 on which is fixed a pinion 33 indicated in dotted lines in Fig. 4. The pinion meshes with a gear 34 fixed on a shaft 35 having its bearings at 36 and 37. The gear 34 drives the pinion 38, loosely mounted on the shaft 35, through a series of springs constituting a tension governor or dynamometer, and which will be more fully hereinafter described. The pinion 38 in turn meshes with and drives a gear 39 fixed to the drum 15 or drum shaft 40.

In order to create an elastic connection between the motor and the floating object, I have provided a tension governed variable speed reversible hydraulic pump connected to a hydraulic motor, which in turn drives the winding drum.

Referring now to Fig. 6, on the shaft 25 is mounted a socket ring 41 which is capable of being tilted on the shaft 25. This socket ring carries one end of a series of connecting rods 42, the other ends of which are connected to pistons 43 in cylinders 44. The socket ring 41 is received in a tilting box 45 the angular position of which with reference to the shaft 25 may be varied by means which will be hereafter described.

Fluid, such as oil, is pumped through one of the pipes as 27, to the hydraulic motor 29, and is returned to the pump by the other pipe 28. It will be evident that the amount of liquid pumped will depend upon the angular position of the tilting box and socket ring with reference to the shaft 25.

In the position illustrated in Fig. 6, the tilting box and socket ring are in the neutral position; that is, they are perpendicular to the shaft, and when in this position, no liquid is pumped. When the tilting box and socket ring are tilted in one direction from the neutral axis, liquid is pumped in a given direction, and when it is tilted in the opposite direction, the liquid is pumped in the opposite direction. I have indicated in dotted lines in Fig. 4, cylinders 46 provided with pistons connected by piston rods 47 to a socket ring 48 fixed on the shaft 30 at a given angle.

The hydraulic device comprising the variable speed reversible pump, and the hydraulic motor which is actuated thereby, is a well-known device and I have not, therefore, gone more fully into details in describing the same, since any form of variable speed reversible hydraulic pump and motor will serve my purpose.

The speed of the hydraulic motor and its direction of rotation is controlled by means which I will now describe.

The gear 34 (Fig. 7) is connected to the pinion 38 through a number of springs 49. These springs are preferably compression springs, one end of the spring surrounding a member 50 formed with shoulders as at 51 against which the one end of the spring is received, the member 50 preferably being pivoted to the gear as at 52. The other end of the spring similarly surrounds a member 53 which is pivoted as at 54 to a plate 55 fixedly attached to the pinion 38.

When there is no pull on the rope, the springs 49 are fully expanded. When tension is produced on the rope, then the members 50 and 53 approach each other and produce a given tension in the spring 49. These coil springs are designed to be fully compressed at a tension in the hoist rope which is far less than the weight to be hoisted. To prevent the springs from entirely collapsing, the stop 56 attached to the plate 55 engages a stop 57 on the gear wheel. For example, with a winch having a capacity of 8000 lbs., I have found it desirable that these springs be fully compressed under a tension on the rope of approximately 1500 lbs., which, as will be noted, is less than one-third of the capacity of the machine and which is only a small fraction of the weight of the float which may be, for example, 6,000 lbs.

The relative movement produced between the gear 34 and the plate 55 and, therefore, the pinion 38, is transformed into a reciprocating motion of a rod or pin 58 (see Fig. 10), which in turn automatically controls the speed and motion of the pump and indirectly the hydraulic motor. The means for producing the reciprocating movement of the rod or pin 58 comprises a link 59 (Fig. 7), one end of which is pivoted by means of a pin 60 to a second pin 61 which is, in turn, mounted in lugs 62 on the plate 55. The opposite end of the link 59 is pivoted as at 63 to one arm 64 of a bell crank 65, the opposite arm 66 of which engages a slot 67 in the rod 58. Any relative movement, therefore, between the gear 34 and the pinion 38 causes an axial movement of the rod 58 and actuates the control mechanism for the pump. The free end of the rod 58 is mounted for free rotation in a cap 68 on the end of a sliding member 69 mounted in a stand 70 on the frame 71. The rod 72 is provided at one end with screw threads 73 engaging the internal screw threads in the nut or sliding member 69 by which adjustments are made in the winding in capacity of the winch.

The member 69 is prevented from rotation in the stand 70 by the keys 74, but is free to slide to and fro in its bearing.

The rod 72 has an extension piece 75 on the end of which is nut and washer 76. Surrounding extension piece 75 is a shock absorbing coil spring 77. This extension piece, spring, washer, and nut lie within a sliding member 78 which member, in turn, is mounted within a rotatable member 79 mounted to turn in the stand 80 secured on the bed frame 71. Member 79 may be rotated manually through the agency of the hand spokes 81 attached thereto, and when such is rotated manually in one direction, rod 72 is screwed in the member 69, and in the opposite direction it is screwed out from the member 69.

Thrust bar 82 is pivoted at 83 to a sliding member 84 located in rotatable member 79. The other end of the thrust bar 82 is pivoted at 85 to the link 86 which resembles the customary "Stevenson" link used in locomotives.

The link 86 is provided with a slot 87 in which is received a pin 88 secured to one arm 89 of a bell crank 90 which is pivoted at 91, and the opposite end of which is provided with a slot 92 in which is received a pin 93 secured to the end of the plunger 94 which actuates the tilting box and socket ring for controlling the pump.

Plunger 94 may be moved from its highest to its lowest position with a very small force if applied gradually. To be more specific, the pump may be reversed from high speed forward to high speed reverse in two seconds with a small manual push on plunger 94. Attempts to reverse in one quarter of this time period requires a much greater manual effort. This explains the need of a shock absorber spring 77 (to act as an accumulator) to absorb quickly acting jerks that may come upon the rope and be transformed to the sliding rod 58 and its associated parts. The spring 77 should be of a capacity to be fully compressed by a force somewhat in excess of that required to move the bell crank 90 and plunger 94. A sudden jerk would at once compress this spring, which spring in expanding yields sufficient force to move the plunger 94.

The control mechanism is also capable of operation through a manually operated thrust bar 95 which is pivoted at 96 (see Fig. 11), the other end of the manually operated thrust bar being pivoted at 97 to the upper end of the link 86. The manually operated thrust bar is actuated by a lever 98 pivoted as on a shaft 99, but only after the link 86 shall have been lowered to bring bar 95 in a horizontal position. This is accomplished by moving handle of reset lever 100 to the left (see Figs. 12 and 13). The lever is pivoted at 101 to standard 102, and has an extension with a slotted hole 103 at its lower end, and engaging pin 104 on arm 105 of bell crank 106. Arm 107 engages link bar 108 at pin 109. The link bar also engages link 86 at pin 110. When, therefore, lever 100 is thrown to the left, link 86 is dropped and thrust bar 95 comes into position to operate bell crank 90 and plunger 94.

It will be noted in Fig. 12 that sliding member 78, bar 82, and arm 89 of bell crank 90 has been moved to the right, and plunger 94 has been moved upward at which position the pump, hydraulic motor and drum 15 has been reversed paying out rope as demanded when the boom is rising, leaving the float on the sea. In rising, the winch pays out rope slowly at first, then faster until the boom has reached its mid-swing position, at which period the speed is maximum, and as boom rises further, the speed is gradually reduced to zero speed when boom is at the top of its upper swing. The mechanism to govern the speed of the pump has already been described. When the boom lowers, the tendency is to throw slack (at first slowly) in the rope, resulting in a reduced tension in the rope. This causes the tension governor to move in a direction to throw rods 58 and 72 and bar 82, and all associated parts, to the left, swinging the upper arm of the bell crank 90 downward from neutral sufficiently to cause the winch to wind in rope and thus restore its normal tension. The rope is paid out faster and faster until boom is in mid-swing position, and then slower until the boom reaches its lowest position when the speed becomes zero. At the same period, the winch will stop and plunger 94 will be in its mid-position. At this point, the operator may safely throw lever 100 hard over to the left, which throws out the automatic operation and then move lever 98 gradually to the left, whereupon the speed of hoisting is gradually increased to hoist the airplane up towards the boom end, but wholly apart from this operation of the winch, the airplane will be hoisted with the boom, first slowly, then faster, the acceleration of the movement of the plane keeping step with the natural acceleration of the rolling ship and its overhanging boom. As the plane is thus being hoisted from the sea, seamen aboard the ship will swing the boom, on a pivot perpendicular to the ship's deck, for about 90 degrees, or sufficiently to bring the airplane well over the deck when it may be lowered manually to the deck. It is required for safety that the time for hoisting the full weight up to the boom be less than a complete double roll of the ship, so that upon the next down swing of the boom, the airplane will not strike the sea. The airplane delivered to the deck, the rope is unhooked and the winch, under manual control, is then ready to again pay out rope manually to another plane which may be hooked on as already described. However, it should be added that after the slack rope is hooked on to a float, manual operation should cease, and to produce automatic operation, lever 100 is to be thrown hard over to the right. Lever 100 should be thrown to the right when the rope is slack. This slack will cause the tension governor to throw the winch into full speed winding in, the capacity of the winch to hoist being previously adjusted to its minimum hoist capacity by employing the adjusting means already described. It is only during automatic operation of the winch that dangerous jerks may be prevented. This automatic operation must be maintained so long as the airplane rests on the sea.

While I have described the embodiment of my invention at present preferred by me, it will, of course, be understood that various modifications and changes may be made therein without departing from the spirit and without exceeding the scope of my claims, for, while in the embodiment of my invention illustrated, I have shown a bell crank for operating the plunger 94, this plunger could be operated by a screw mechanism.

I claim:

1. In combination, a support adjacent to a body of water, a winch mounted on said support, an overhanging boom provided at its end with a pulley projecting over the water, a float in the water located adjacent said support, a cable wound on the drum of the winch extending over said pulley and connected to said float, and automatic means responsive to variations in tension in the cable and operable with a tension on the cable less than one-third of the capacity of the device for compensating for said variations.

2. In combination, a float in water subject to rise and fall through wave action, a hoisting rope attached to said float and leading upwards to and over an elevated support, a winch for hoisting said float containing automatic means for paying out rope when the float falls through wave action, automatic means for winding in the rope to prevent slack as the float rises, and manually controlled means for causing said winch to hoist the float above the water.

3. In combination, a float in water subject to rise and fall through wave action, a hoisting rope attached to said float and leading upwards to and over an elevated support, a winch comprising a hoisting drum and a motor for operating the same for hoisting said float containing automatic means for paying out rope when the float falls through wave action, an elastic and a non-elastic connection between said drum and the motor for operating same, automatic means for winding in the rope to prevent slack as the float rises, manually controlled means for causing said winch to hoist the float above the water, said elastic means being interposed between said drum and said motor while the float remains in the water, and the non-elastic means being interposed between said drum and said motor while said float is being hoisted.

4. A ship at sea subject to rolling due to wave action, an outboard boom attached thereto provided at its end with a pulley, a float in the sea alongside said ship, a winch for hoisting said float, a rope leading over said pulley, automatic means for paying out rope when the outboard end of said boom rises, the tension in said rope being only a small fraction of the weight of the float, automatic means for winding in rope to prevent slack as the boom falls, and means for hoisting the float above the sea.

5. In combination, a ship subject to rolling and provided with an outboard boom having a pulley at its end, a float in the sea alongside said ship and of relatively small size compared thereto, means for hoisting said float comprising a winch, a rope wound on a drum of said winch and leading over said pulley and attached to said float, and means whereby said rope may be maintained at substantially constant tension while the rope tension is but a small fraction of the weight of the float.

6. In combination, a ship subject to rolling and provided with an outboard boom having a pulley at its end, a float in the sea alongside said ship and of relatively small size compared thereto, means for hoisting said float comprising a winch, a rope wound on a drum of said winch and leading over said pulley and attached to said float, and automatic means whereby said rope may be maintained at substantially constant tension while the rope tension is but a small fraction of the weight of the float.

7. In combination, a ship subject to rolling and provided with an outboard boom having a pulley at its end, a float in the sea alongside said ship and of relatively small size compared thereto, means for hoisting said float comprising a winch, a rope wound on a drum of said winch and leading over said pulley and attached to said float, means whereby said rope may be maintained at substantially constant tension while the rope tension is but a small fraction of the weight of the float, and manually controlled means for causing said rope to hoist the float from the sea.

8. A winch adapted to hoist a float in a seaway comprising a substantially constant speed motor for driving a pump, means for varying the stroke of the pump and the flow of liquid therefrom, a hydraulic motor operable by fluid from the pump, said hydraulic motor driving a train of gearing, a tension governor, and automatic means whereby said tension governor controls the speed of pumping.

9. In combination, a vessel, a winch mounted thereon comprising a winding drum, a support mounted on said vessel and extending outwardly beyond the same, a cable wound upon said drum extending outwardly along said support and adapted to be attached to a float adjacent to said vessel, automatically controlled means for paying out cable from said drum on an increase in tension on said cable and winding in cable onto said drum on a decrease in tension on said cable and while the float is floating in the water, and manually controlled means for operating said winch for hoisting said float from the water.

10. In combination, a vessel, a winch mounted thereon comprising a winding drum and a motor for operating the same, an elastic and a non-elastic connection between said motor and said drum, a support mounted on said vessel and extending outwardly beyond the same, a cable wound upon said drum extending outwardly along said support and adapted to be attached to a float located adjacent to said vessel, means for connecting said drum to said motor by said elastic connection while said float remains in the water, and means for connecting said drum to said motor by said non-elastic connection to lift said float from the water.

THOMAS SPENCER MILLER.